United States Patent Office 3,419,549
Patented Dec. 31, 1968

3,419,549
3β-HYDROXYANDROST-5-EN-17-ONE AZINES
Robert W. Hamilton, Wilmette, Ill., assignor to G. D. Searle & Co., Chicago, Ill., a corporation of Delaware
No Drawing. Filed Aug. 16, 1966, Ser. No. 572,670
6 Claims. (Cl. 260—239.5)

This invention relates to 3β-hydroxyandrost-5-en-17-one azines, and processes for the preparation thereof. More particularly, this invention provides new, useful, and unobvious chemical compounds of the formula

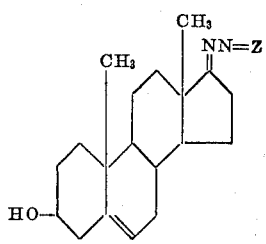

wherein Z represents an alkylidene, cycloalkylidene, cycloalkylmethylene, benzylidene, halobenzylidene, naphthylmethylene, or pyridylmethylene radical.

Among the alkylidene radicals, represented by Z, lower alkylidenes are preferred, i.e., radicals of the formula

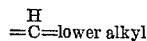

the lower alkyl constituent being methyl, ethyl, propyl, isopropyl, butyl, isobutyl, sec-butyl, tert-butyl, pentyl, neopentyl, hexyl, isohexyl, or like monovalent, saturated, acyclic, straight- or branched-chain, hydrocarbon grouping of empirical formula $$-C_nH_{2n+1}$$

wherein $n$ represents a positive integer less than 8.

Among the cycloalkylidene radicals represented by Z, cyclopentylidene, cyclohexylidene, and cycloheptylidene are preferred, i.e., radicals of the formula

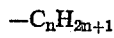

wherein $x$ represents a positive integer less than 4.

Similarly, preferred cycloalkylmethylene radicals are those of the formula

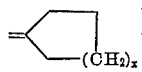

wherein $x$ is defined as before.

Among the halobenzylidene radicals represented by Z, chlorobenzylidenes are preferred, i.e., radicals of the formula

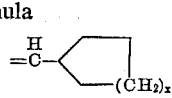

wherein, as indicated, the chlorine atom can be $o$, $m$, or $p$ with respect to the methylene grouping. Similarly, both 1 and 2 naphthylmethylene radicals are within the ambit of this invention, as are 1, 2, and 3 pyridylmethylenes.

The compounds to which this invention relates are useful by reason of their valuable pharmacological properties. Thus, for example, they are anti-hypercholesterolemic and anti-hyperlipemic.

Preparation of the subject compounds proceeds by heating a benzene solution of 3β-hydroxyandrost-5-en-17-one hydrazone with an appropriate aldehyde or ketone

Z being defined as before.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

3β-hydroxyandrost-5-en-17-one azine with acetaldehyde

To a solution of 50 parts of 3β-hydroxyandrost-5-en-17-one hydrazone in 1750 parts of benzene at 70° is added 8 parts of acetaldehyde. The resultant mixture is heated at the boiling point under reflux for 1 hour, during which water is removed as formed. Solvent is thereupon distilled off in vacuo and the residue taken up in ethanol. To the ethanol solution, sufficient water is added to induce cloudiness. The precipitate which forms is collected on a filter, washed with aqueous 50% ethanol, and dried in air. The product thus isolated is 3β-hydroxyandrost-5-en-17-one azine with acetaldehyde melting at 148–157° with gas evolution. The product has the formula

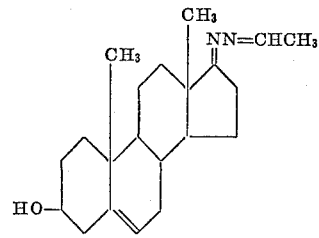

EXAMPLE 2

3β-hydroxyandrost-5-en-17-one azine with cyclohexanone

To a solution of 50 parts of 3β-hydroxyandrost-5-en-17-one hydrazone in 1750 parts of benzene at 70° is added 18 parts of cyclohexanone. The resultant mixture is heated at the boiling point under reflux for 1 hour, water being removed as formed. Solvent is distilled off in vacuo and the residue taken up in 350 parts of benzene. To the benzene solution, sufficient hexane is added to induce cloudiness. The precipitate which forms is filtered off, washed with hexane, and dried in air. The product thus isolated is 3β-hydroxyandrost-5-en-17-one azine with cyclohexanone sintering at 152° and melting at 155–158°. The product has the formula

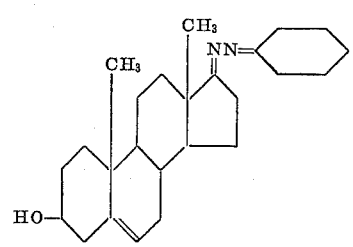

EXAMPLE 3

3β-hydroxyandrost-5-en-17-one azine with cyclohexanecarboxaldehyde

Substitution of 21 parts of cyclohexanecarboxaldehyde for the cyclohexanone called for in Example 2 affords, by the procedure there detailed, 3β-hydroxyandrost-5-en- 17-one azine with cyclohexanecarboxaldehyde, having the formula

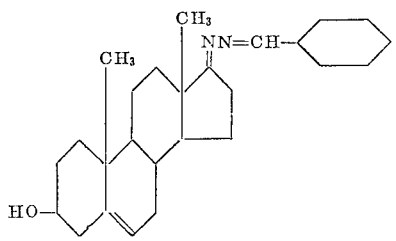

EXAMPLE 4

3β-hydroxyandrost-5-en-17-one azine with benzaldehyde

Substitution of 20 parts of benzaldehyde for the cyclohexanone called for in Example 2, affords, by the procedure there detailed, 3β-hydroxyandrost-5-en-17-one azine with benzaldehyde, having the formula

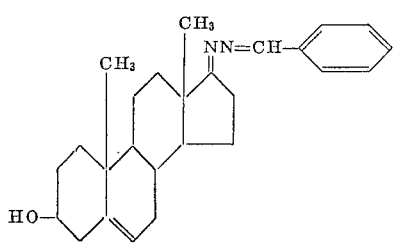

EXAMPLE 5

3β-hydroxyandrost-5-en-17-one azine with p-chlorobenzaldehyde

Substitution of 26 parts of p-chlorobenzaldehyde for the cyclohexanone called for in Example 2 affords, by the procedure there detailed, 3β-hydroxyandrost-5-en-17-one azine with p-chlorobenzaldehyde sintering at 161° and melting at 177–180°. The product has the formula

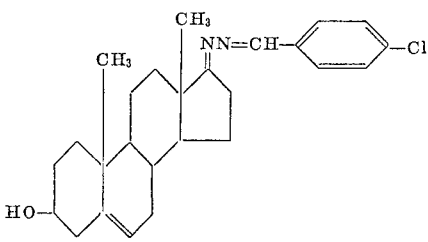

EXAMPLE 6

3β-hydroxyandrost-5-en-17-one azine with 1-naphthaldehyde

Substitution of 29 parts of 1-naphthaldehyde for the cyclohexanone called for in Example 2 affords, by the procedure there detailed, 3β-hydroxyandrost-5-en-17-one azine with 1-naphthaldehyde melting at 102–125° with gas evolution. The product has the formula

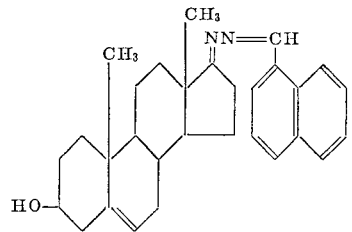

EXAMPLE 7

3β-hydroxyandrost-5-en-17-one azine with 4-pyridinecarboxaldehyde

Substitution of 20 parts of 4-pyridinecarboxaldehyde for the cyclohexanone called for in Example 2 affords, by the procedure there detailed, 3β-hydroxyandrost-5-en-17-one azine with 4-pyridinecarboxaldehyde softening at 172°, sintering at 173°, and melting at 175–178°. The product has the formula

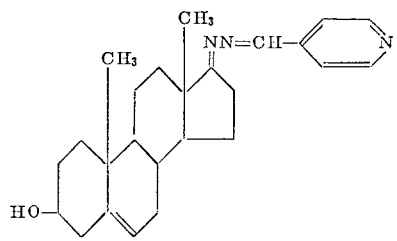

What is claimed is:
1. A compound of the formula

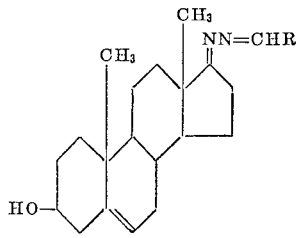

wherein R represents lower alkyl, cyclohexyl, phenyl, chlorophenyl, naphthyl, or pyridyl; or a compound of the formula

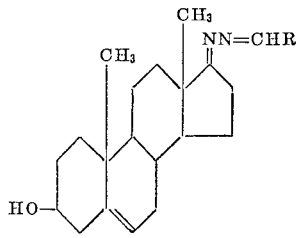

2. A compound according to claim 1 which is 3β-hydroxyandrost-5-en-17-one azine with acetaldehyde.
3. A compound according to claim 1 which is 3β-hydroxyandrost-5-en-17-one azine with cyclohexanone.
4. A compound according to claim 1 which is 3β-hydroxyandrost-5-en-17-one azine with p-chlorobenzaldehyde.
5. A compound according to claim 1 which is 3β-hydroxyandrost-5-en-17-one azine with 1-naphthaldehyde.
6. 3β-hydroxyandrost-5-en-17-one azine with 4-pyridinecarboxaldehyde.

References Cited

UNITED STATES PATENTS

| | | |
|---|---|---|
| 2,200,307 | 5/1940 | Schoeller et al. |
| 2,566,336 | 9/1951 | Julian et al. |
| 3,062,847 | 11/1962 | Ruggieri. |
| 3,288,817 | 11/1966 | Klimstra. |

LEWIS GOTTS, *Primary Examiner.*

E. G. LOVE, *Assistant Examiner.*

U.S. Cl. X.R.

167—65; 260—397.5